United States Patent [19]

Stahlecker et al.

[11] Patent Number: 5,195,312
[45] Date of Patent: Mar. 23, 1993

[54] SPINNING OR TWISTING SPINDLE ARRANGEMENT

[75] Inventors: Gerd Stahlecker, Eislingen/Fils; Hans Braxmeier, Süssen, both of Fed. Rep. of Germany

[73] Assignee: Fritz and Hans Stahlecker, Fed. Rep. of Germany

[21] Appl. No.: 596,032

[22] Filed: Oct. 11, 1990

[30] Foreign Application Priority Data

Oct. 17, 1989 [DE] Fed. Rep. of Germany ....... 3934618

[51] Int. Cl.$^5$ .................... D01H 7/08; F16C 33/58
[52] U.S. Cl. ..................... 57/135; 384/571; 384/572
[58] Field of Search ............... 57/135, 133, 134, 130, 57/132, 88; 384/227, 565, 571, 572, 569, 603, 239; 242/35

[56] References Cited

U.S. PATENT DOCUMENTS

| 2,051,641 | 8/1936 | Magrath | 384/603 X |
| 2,675,280 | 4/1954 | Meadows | 57/130 |
| 2,777,739 | 1/1957 | Beerli | 384/227 |
| 3,194,618 | 7/1965 | Hamaker | 384/619 |
| 3,827,771 | 8/1974 | Fernlund | 384/564 |
| 4,403,813 | 9/1983 | Schaefer | 384/572 |

FOREIGN PATENT DOCUMENTS

| 0026539 | 7/1972 | Japan | 384/571 |
| 689261 | 3/1953 | United Kingdom . | |

Primary Examiner—Daniel P. Stodola
Assistant Examiner—John Rollins
Attorney, Agent, or Firm—Evenson, Wands, Edwards, Lenahan & McKeown

[57] ABSTRACT

In the case of a spinning or twisting spindle to be arranged vertically, having a spindle shaft which is disposed in a spindle bearing housing by means of a step bearing and a bolster which is constructed as a roller bearing, it is provided that the rollers of the roller bearing are guided such that, at least when the spindle shaft rotates, they are aligned diagonally with respect to the axis of the spindle shaft in such a manner that they exercise an axial thrust in the direction of the step bearing on the spindle shaft.

19 Claims, 7 Drawing Sheets

SPINNING OR TWISTING SPINDLE ARRANGEMENT

BACKGROUND AND SUMMARY OF THE INVENTION

The invention relates to a spinning or twisting spindle to be arranged vertically, having a spindle shaft which is disposed in a spindle bearing housing comprising a step bearing and a bolster which is constructed as a roller bearing, the rollers of which are held by means of a roller cage in the circumferential direction, and by means of rims in the axial direction, and with their circumferential surfaces, run on a running surface of an outer ring of the bearing inserted into the spindle bearing housing and on a running surface of the spindle shaft.

In the case of spinning or twisting spindles of the initially mentioned type, there is the problem that, particularly at high rotational speeds, the spindles have the tendency to rise upwards in the vertical direction. The cause of these vertical forces which results in the rising of the spindles is not completely clear. It is conceivable that this rising is caused by the drive, such as a tangential belt which does not move exactly perpendicularly with respect to the spindle shaft. It is probable, however, that the bolsters also contribute to the occurring axial forces, as tests have indicated. The rollers may slope relative to the spindle shaft such an axial upward directed thrust is generated.

It is an object of the invention to provide a spinning or twisting spindle of the initially mentioned type in which the rising in the axial direction is reliably prevented.

This object is achieved in that the rollers are guided in such a manner that, at least when the spindle shaft is rotating, they are aligned diagonally with respect to the axis of the spindle shaft, in which case, with their areas facing away from the step bearing, they move ahead of the areas facing the step bearing, in the rotating direction.

By means of this construction, it is achieved that the rollers exercise an axial thrust on the spindle shaft which is directed toward the step bearing. In this manner, an axial thrust is intentionally generated by means of the bolster which counteracts the rising. Thus it is no longer accidental whether the rollers of the bolsters constructed as a roller bearing participate in forces which may promote a rising of the spindles and it is intentionally provided that the rollers exercise such an axial thrust on the spindle that this thrust is directed against a possible force causing the rising.

In a first embodiment of the invention, it is provided that the roller cage of the bolster is equipped with roller pockets which are aligned diagonally with respect to the axis of the spindle shaft. As a result, the intended diagonal positioning of the rollers is caused by a corresponding guiding by means of the roller pockets of the roller cage. In this embodiment, the rollers are constantly held in this diagonal position so that the direction of the axial thrust is a function of the rotating direction of the spindle. A spindle which is equipped with this type of a roller bearing can therefore be operated only in one rotating direction.

In order to achieve in a further development of the invention that irrespective of the rotating direction of the spindle, an axial thrust is always generated which is directed toward the step bearing, it is provided in another embodiment that the rollers have a shape which tapers in the shape of a truncated cone in the direction of the step bearing. In this embodiment, the rollers will align themselves when the spindle shaft rotates. They place themselves diagonally in each case in such a manner that an axial thrust is generated which is directed toward the step bearing.

In another embodiment of the invention, it is provided that the running surface of the spindle shaft has a shape that tapers toward the step bearing in the shape of a truncated cone. Also in the case of this embodiment, the rollers align themselves with the rotating spindle shaft in such a manner that an axial thrust in the direction of the step bearing is always generated, irrespective of the rotating direction of the spindle shaft.

In another embodiment of the invention, it is provided that the running surface of the outer ring of the bearing has a shape that widens into a step bearing in the shape of a truncated cone. Also in this embodiment, the rollers are taken along by the rotating spindle shaft and are aligned diagonally in such a manner that, irrespective of the rotating direction, an axial thrust is always generated which is directed to the step bearing.

Other objects, advantages and novel features of the present invention will become apparent from the following detailed description of the invention when considered in conjunction with the accompanying drawings.

DETAILED DESCRIPTION OF THE DRAWINGS

Figure 1:
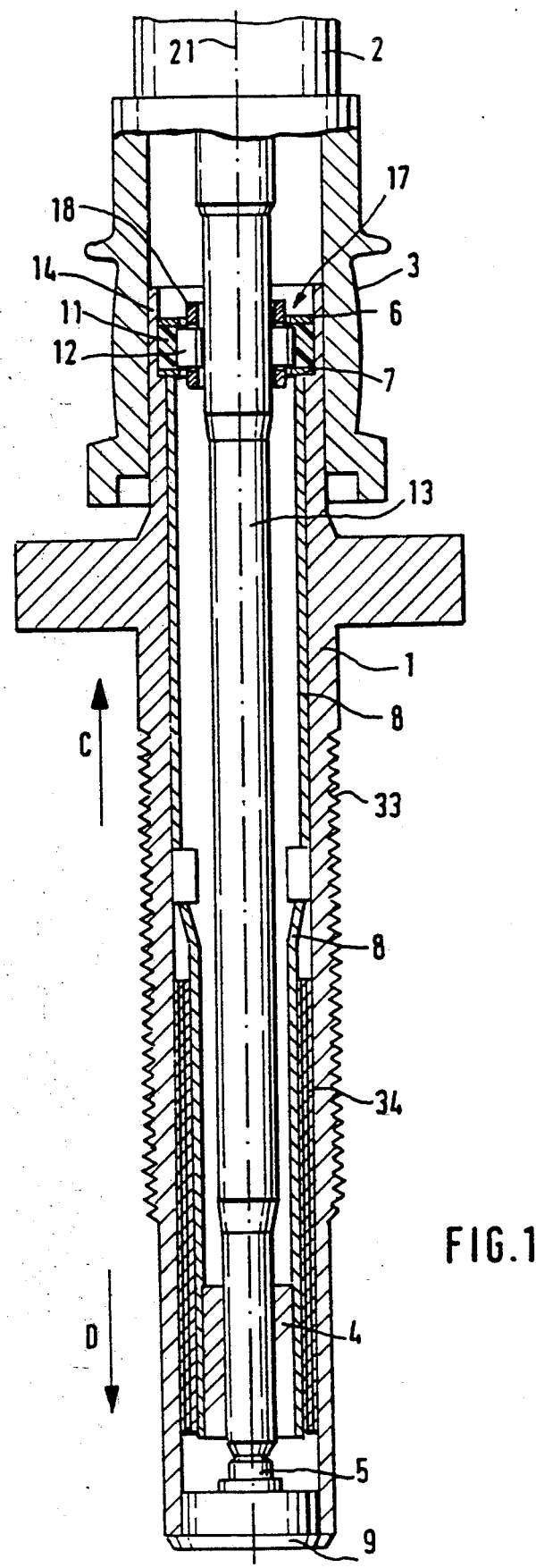
FIG. 1 is an axial partial sectional view of a bearing of a spinning or twisting spindle, the shaft of which is disposed in a spindle bearing housing by means of a bolster constructed as a roller bearing and by means of a step bearing constructed as a slide bearing.

The spinning or twisting spindle shown in FIG. 1 has a spindle bearing housing 1 in which a spindle top part 2 is disposed. The spindle top part 2 is provided with a wharve 3 by means of which a driving takes place, particularly by means of a tangential belt moving against the wharve 3. The spindle top part 2 is non-rotatably connected with a spindle shaft 13 which penetrates into the spindle bearing housing 1 and is disposed in it by means of a bolster 17 in the area of the wharve 3 and by means of a step bearing 4 in the area of its end. The end of the spindle shaft 13 supports itself against a bearing disk 5 which is held by a stopper 9 sealingly inserted into the lower end of the spindle bearing housing 1 and held by means of a crimping.

The step bearing 4 is constructed as a slide bearing which, by means of an elastic sleeve 8, is held at a radial distance to the interior walls of the spindle bearing housing 1. Between the elastic sleeve 8 and the interior walls of the spindle bearing housing 1, a damping device 34 is provided, for example, in the form of a wound oil spool.

The bolster 17 is constructed as a roller bearing, the rollers 12 of which run on a running surface of an outer ring of the bearing and on a running surface of the spindle shaft 13. The outer ring 11 of the bearing is pressed into a receiving device 14 of the upper end of the spindle bearing housing 1. The rollers 12 are held in the axial direction by means of flanged disks 6, 7 which are also inserted into the receiving device 14 of the spindle bearing housing 1. The rollers 12 are held in the circumferential direction by means of a roller cage 18 at predetermined distances.

As illustrated in FIG. 1, the spindle bearing housing 1 is provided with a thread 33 on the outside onto which a nut can be screwed for the fastening of the spindle bearing housing 1 to a spindle rail. This type of a spinning or twisting spindle, as it is illustrated in FIG. 1, in practice is arranged in such a manner that the spindle shaft axis 21 is aligned vertically. The own weight of the spindle top part 2 with the spindle shaft 13 and the own weight of a spool which is not shown and is arranged on the spindle top part 2 cause a force component vertically downward in the direction of the arrow (D) against which a supporting of the end of the spindle shaft 13 takes place on the bearing plate 5. In the practical operation, it was found that, in the case of this type of a construction, very obviously, forces also occur in the opposite direction, i.e., in the direction of the arrow (C) which, under certain circumstances, may exceed the forces in the direction (D). Since the spindle top part 2 is not fixed in the direction (C) of these forces, there is the risk that the spindle top part 2 will move upwards relative to the spindle bearing housing 1; i.e., will rise. In order to exclude the danger of the rising of the spindle top part 2 also at high rotational speeds, it is provided according to the invention that in the area of the bolster 17, an axial thrust is generated which acts on the spindle shaft 13 and which acts in the direction of the step bearing 4 and of the bearing plate 5; i.e., promotes the forces of weight in the direction of the arrow (D).

Figure 3:
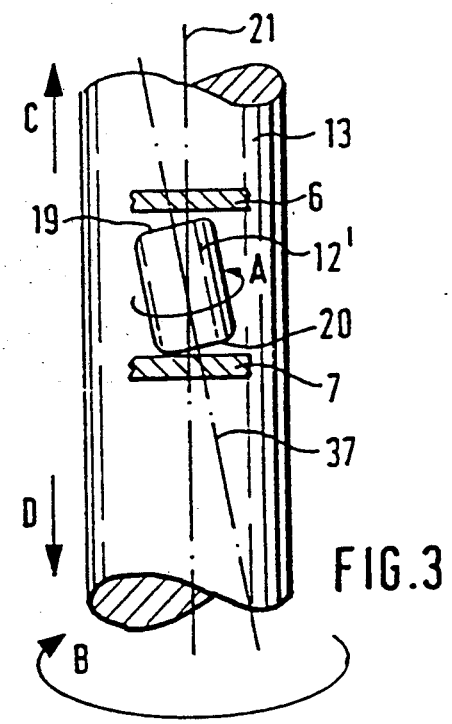
FIG. 3 is a radial view of a single roller in order to explain the forming relationships of force.
Figure 4:
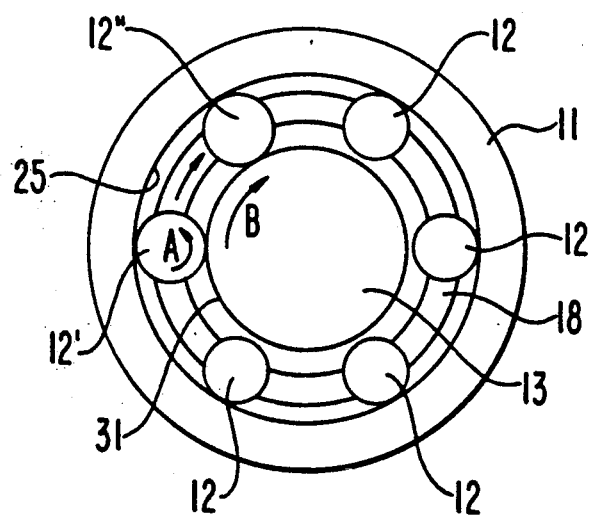
FIG. 4 is a view in the axial direction of the area of the roller bearing.

The principle of generating this type of an axial thrust is first explained by means of FIG. 3 and 4. As shown in FIG. 4, the running surface 31 of the spindle shaft 13 runs on several rollers 12 uniformly distributed over the circumference. The rollers 12 are spaced by means of the roller cage 18. The rollers 12 also run on a running surface 25 of the outer ring 11 of the bearing. When the spindle shaft 13 rotates in the direction of the arrow (B), the rollers 12 are taken along in the direction of the arrow (A) and, in turn, at a reduced speed, take along the roller cage is in the rotating direction of the spindle shaft 13. A certain play is provided between the spindle shaft 13 and the rollers 12. This means that the spindle shaft 13 actually, in each case, rests only against two of the rollers 12—as shown in FIG. 4—against rollers 12', 12", while the others run along at a narrow distance which is illustrated in an exaggerated manner in the drawing. As a result of the centrifugal forces, the rollers 12 which do not rest against the spindle shaft 13 place themselves with their circumferential surfaces against the running surface 25 of the outer ring 11 of the bearing.

As will be explained later, it is ensured by suitable measures that the rollers 12, 12", against which the spindle shaft 13 rests, by means of their axes of rotation 37, place themselves diagonally with respect to the spindle axis 21 in such a manner that the upper area in the rotating direction (B) of the spindle shaft 13 of the rollers 12', 12 moves ahead of the area facing the step bearing 4. As a result of this diagonal positioning (FIG. 3) which is not impaired by a suitable dimensioning of the distance of the flanged disks 6, 7, and against which the front faces 19, 20 of the rollers 12 can support themselves in the axial direction, these are arranged at a sufficient distance from these front faces 19, 20. As a result of this diagonal positioning of the rollers 12', 12", these rollers 12', 12" try to roll themselves off at the spindle shaft 13 in the shape of a helical line. However, since they are secured in the axial direction against a moving-up on the spindle shaft 13 by means of the rim disk 6, they exercise a bearing pressure as a shearing force on the spindle shaft 13 in the opposite direction, i.e., against the helical-line-shaped upward movement which loads it in the axial direction in the direction of the step bearing 4 and of the bearing disk 5. If the rotating direction of the spindle shaft 13 is reversed, i.e., is against the rotating direction (B), and if then also the rotating direction of the rollers 12 is reversed, i.e., against the direction of arrow (A), the shaft 37 of the rollers 12 must naturally be placed diagonally in the opposite direction so that the direction of the generated axial thrust in the direction of the step bearing 4 is maintained. For the purpose of clarification, it should also be mentioned here that the relationships concerning the diagonal positioning are illustrated in a significantly exaggerated manner in order to illustrate them in the drawing according to FIG. 3. In practice, a diagonal positioning of less than 1° is sufficient in order to achieve the desired effect.

The intended diagonal positioning of the rollers 12 can be achieved by various measures which will be explained in detail by means of the following figures. In this case, the measures may each be used separately or in combination with one another in order to implement the desired diagonal positioning of the rollers 12.

Figure 2:
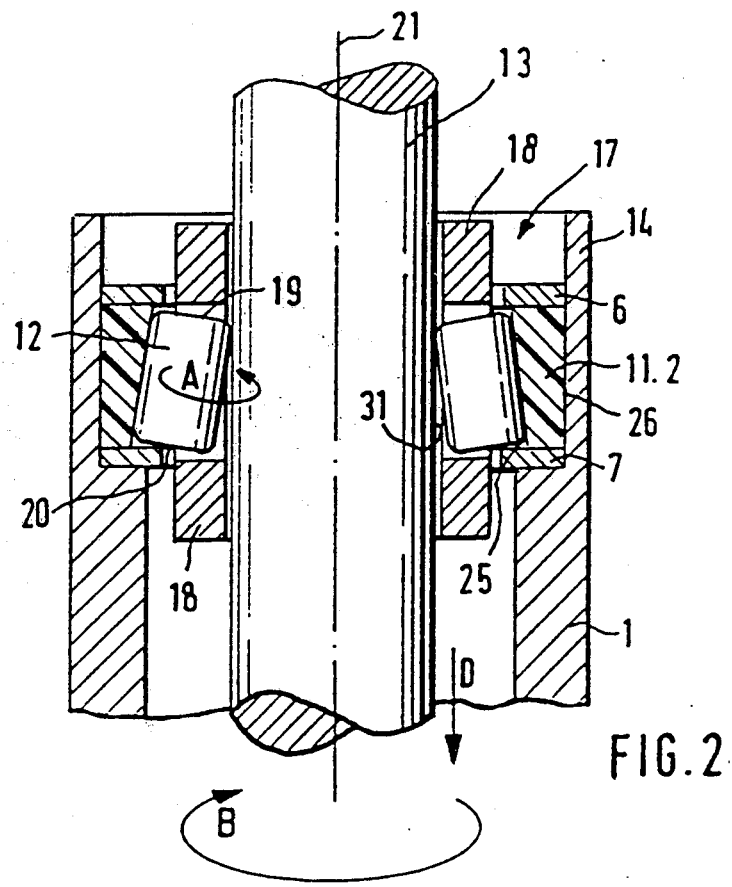
FIG. 2 is a partial sectional view of the area of the bolster of a first embodiment with an outer ring of the bearing which has a running surface which widens in the shape of a truncated cone into a step bearing.

In the embodiment according to FIG. 2, an outer ring 11.2 of the bearing is pressed into the stepped receiving device 14 of the spindle bearing housing 1 and is provided with a running surface 25 widening in the shape of a truncated cone in the direction of the step bearing. As shown in FIG. 2, as a result of the truncated-cone shape of the running surface 25, the rollers 12 can displace themselves in such a manner that the diagonal positioning of their rotating shafts 37 is obtained with respect to the axis 21 of the spindle shaft 13 shown in FIG. 3. In this case, there is also the advantage that this diagonal positioning of the rollers 12 into the desired position is naturally achieved when the spindle shaft 13 rotates. In this case, the rollers 12 position themselves diagonally in such a manner that, in each case, depending on the rotating direction, the position corresponding to FIG. 3 or the position in the opposite direction is obtained, in both cases, an axial thrust being obtained in the direction of the arrow (D); i.e., in the direction of the step bearing 4 and of the bearing plate 5.

Figure 5:
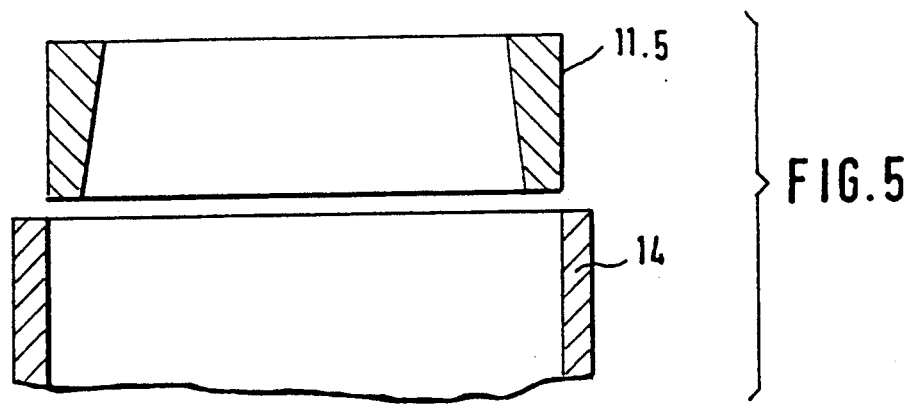
FIG. 5 is a partial sectional view of a bolster before the assembly with a truncated-cone-shaped running surface, which is produced during manufacturing, of the outer ring of the bearing.

As shown in FIG. 5, the assembly of the spindle bearing housing 1 with the outer ring 11.5 of the bearing takes place in that the outer ring 11.5 of the bearing which is provided with a truncated-cone-shaped running surface 25, while maintaining its shape, is pressed into the receiving device 14. The rim disks 7, 6, in a corresponding manner, are also pressed in, in which case the rim disk 6, i.e., the rim disk 6 facing away from the step bearing 4 must be pressed in in such a manner that it is able to absorb the force directed against the axial thrust.

Figure 6:
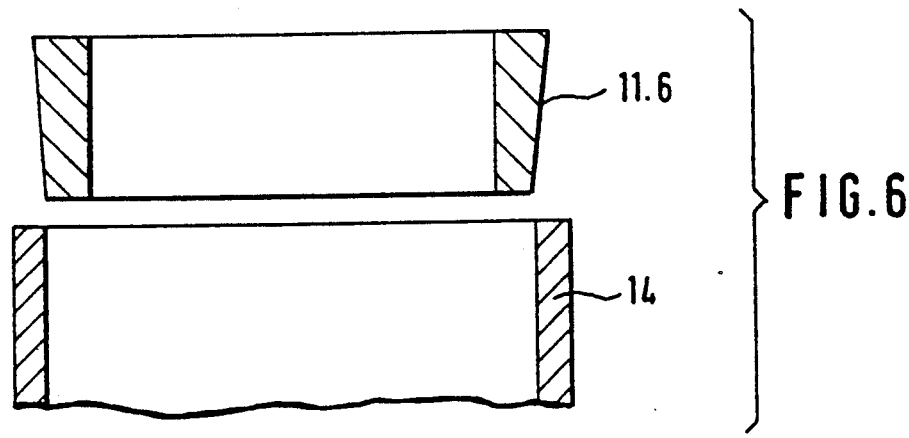
FIGS. 6 to 10 are partial sectional views of the area of the bolster before the installation of the outer ring of the bearing which is deformed during the installation in such a manner that, in the installed condition, it has a running surface which widens into the step bearing in the shape of a truncated cone.

In the embodiment according to FIG. 6, it is provided that the outer ring 11.6 of the bearing is manufactured with a cylindrical running surface. The outer surface with which it is pressed into the receiving device 14 of the spindle bearing housing 1, on the other hand, is constructed to be truncated-cone-shaped, widening in the direction away from the step bearing 4. As a result of the pressing into the receiving device 14 of the spindle bearing housing 1, a deformation of the outer ring 11.6 of the bearing takes place in such a manner that the running surface, during the pressing-in, obtains the desired running surface which widens in the shape of a truncated cone in the direction of the step bearing.

Figure 7:
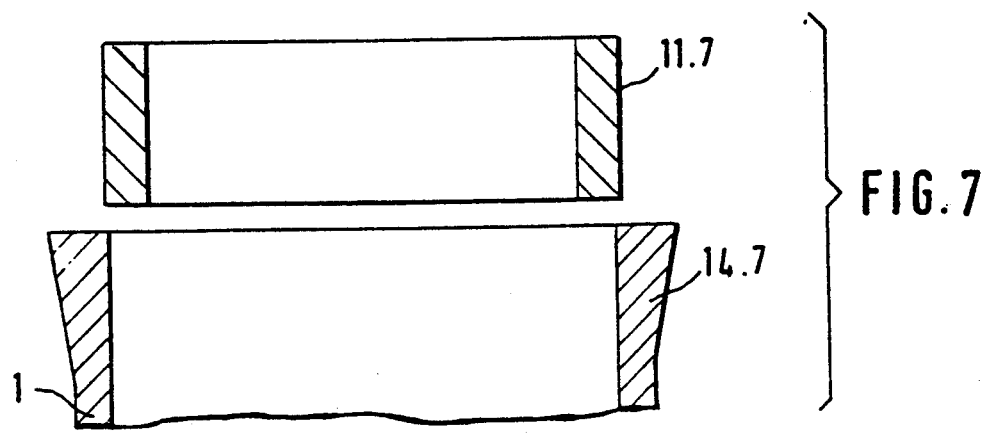
Figure 8:
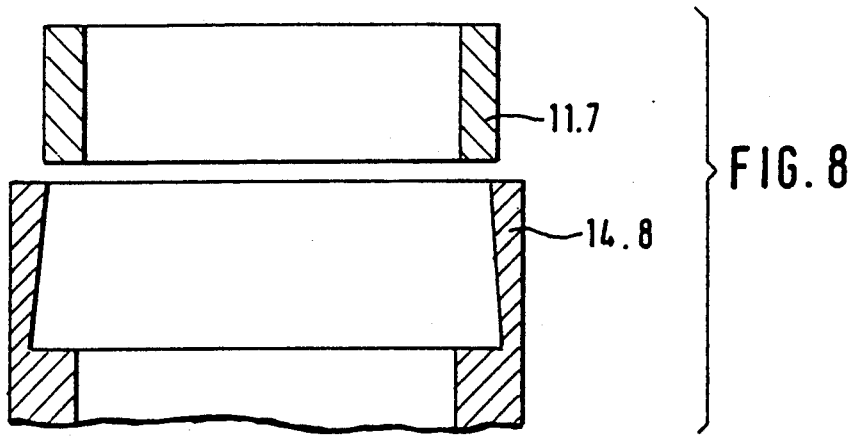

In the embodiment according to FIG. 7 a cylindrical bearing race 11.7 is provided. The cylindrical bearing race 11.7 is pressed into the receiving device 14,7 of the spindle bearing housing 1, a deformation of the bearing race 11.7 also taking place in the desired manner; i.e., that the running surface then receives a shape which widens in the manner of a truncated cone downward in the direction of the step bearing 4. For this purpose, the receiving device 14.7 of the spindle bearing housing 1, in the area of its outer edge, is provided with a thickening which increases continuously to the end. During the pressing-in, the bearing race 11.7 must therefore adapt itself in this area to the inside diameter of the receiving device 14, 7 while, in the connecting softer area, the wall of the receiving device 14, 7 adapts itself to the outer ring 11.7 of the bearing, i.e., it widens correspondingly. This widening of the outer ring 11.7 of the bearing or the compressing in the area facing away from the step bearing 4, in a corresponding manner, is maintained in the embodiment according to FIG. 8 by the fact that the receiving device 14.8 has a shape which widens in the shape of a truncated cone in the direction of the step bearing 4. In the case of this construction, during the pressing-in, the outer ring 11.7 of the bearing is essentially compressed only in its area facing away from the step bearing 4.

Figure 9:
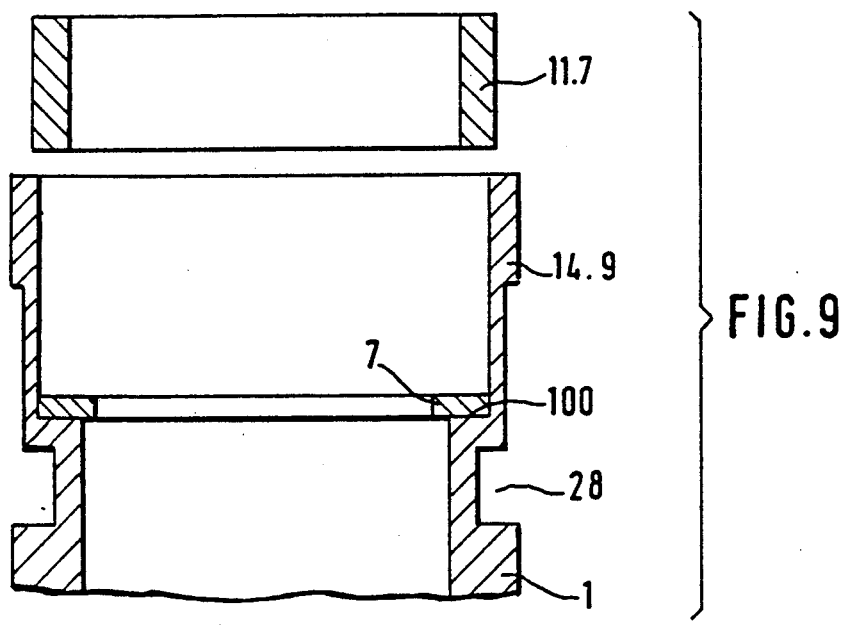

Also, in the embodiment according to FIG. 9, an outer ring 11.7 of the bearing is provided which is manufactured in a cylindrical shape and which is pressed into a receiving device 14.9 of the step bearing housing 1. At its outer end, this receiving device 14.9 has a reinforcement in the form of a ring collar while the area connecting to it is weakened because of the reduced wall thickness. A surrounding outer notch 28, for the purpose of a further weakening, connects to an extension forming the axial stop surface 100 for the rim disk 7.

Figure 10:
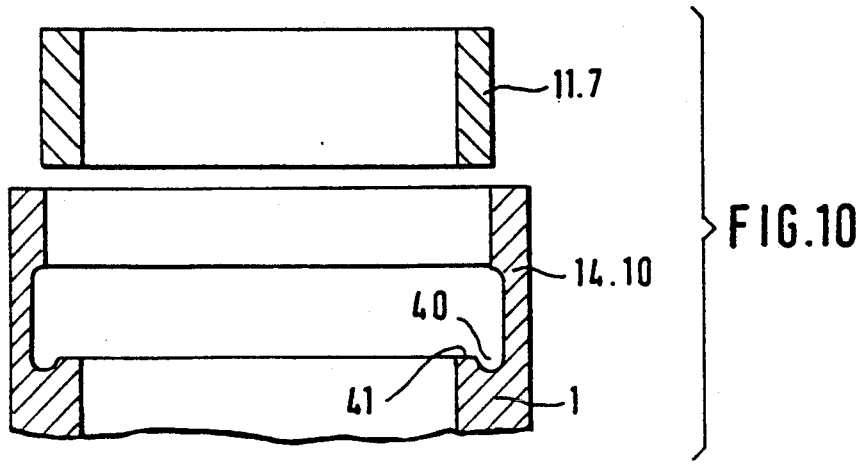

In the embodiment according to FIG. 10, it is provided that a cylindrically manufactured outer ring 11.7 of the bearing is pressed into a receiving device 14.10 of the spindle bearing housing 1. This receiving device 14.10, connecting to its outer relatively thickwalled edge, has an undercutting 40 which extends to a ring collar 41 serving as an axial stop. In this embodiment, the outer ring 11.7 of the bearing is therefore clamped in only in its area facing away from the step bearing 4 and is compressed in the radial direction so that, during the assembly, the shape of the running surface of the outer ring 11.7 of the bearing occurs also which widens in the shape of a truncated cone in the direction of the step bearing 4.

Figure 11:
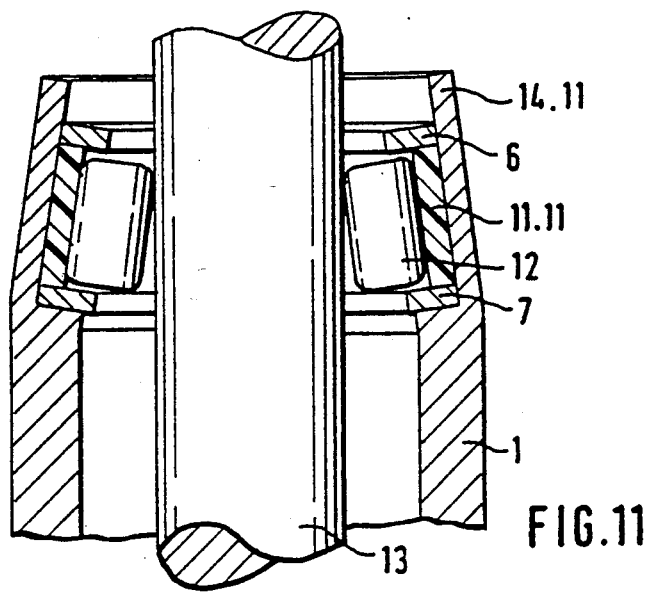
FIG. 11 is a sectional view of another embodiment of the invention with a running surface of the outer ring of the bearing which was produced subsequently after the assembly and widens in the shape of a truncated cone to form the step bearing.

In the embodiment according to FIG. 11, it is also provided that the outer ring 11.11 of the bearing offers to the rollers 12 a running surface which widens in the shape of a truncated cone in the direction of the step bearing 4. In this embodiment, it is provided that the outer ring 11.11 of the bearing, together with the rim disks 6, 7, is at first pressed into the receiving device 14.11 of the spindle bearing housing 1. Subsequently, the pressing-together takes place of the receiving device 14.11 and of the outer ring 11.11 of the bearing in the end area facing away from the step bearing 4 so that the shape is obtained which is shown in FIG. 11. The outer ring 11.11 of the bearing which at first was cylindrical, thus, after the assembling with the spindle bearing housing 1 was deformed in such a manner that the desired inner running surface for the rollers 12 is obtained again which widens in the shape of a truncated cone in the direction of the step bearing 4.

Figure 12:
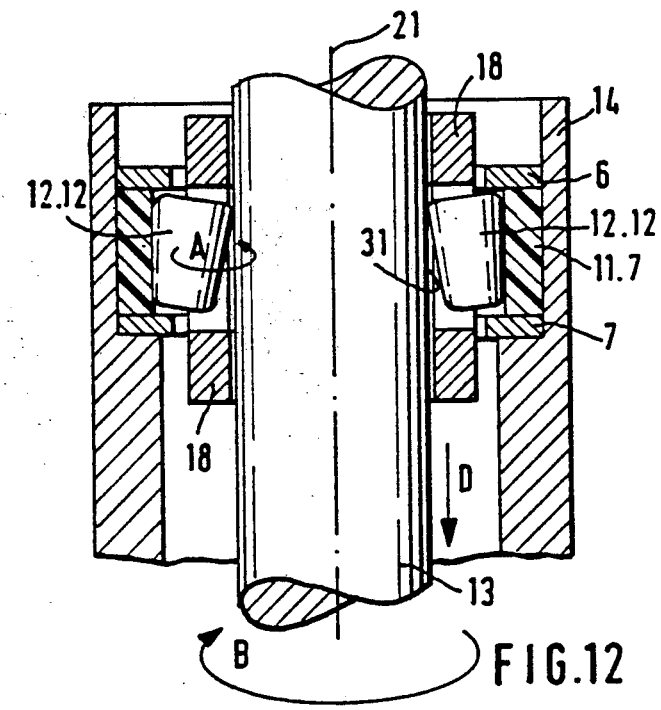
FIG. 12 is a sectional view of the area of a bolster with rollers which taper in the shape of truncated cones in the direction of the step bearing.

In the embodiment according to FIG. 12, the desired intended diagonal positioning of the running rollers 12.12 is achieved in that these have a shape which tapers in the shape of a truncated cone in the direction of the step bearing. Also in this embodiment, which is shown in the neutral condition in FIG. 12, the rollers 12.12 align themselves corresponding to the rotating direction (B) of the spindle shaft 13 so that, corresponding to the representation according to FIG. 3, they have axes of rotation which are aligned diagonally with respect to the axis 21 of the spindle shaft and correspondingly generate an axial thrust. In this embodiment, the rollers 12.12 also adjust themselves corresponding to the rotating direction of the spindle 13 so that also this embodiment, like the previously described embodiments, adjusts itself independently of the rotating direction of the spindle shaft 13 in such a manner that an axial thrust is obtained in the direction of the arrow (D), i.e., in the direction of the step bearing 4. In the embodiment according to FIG. 12, the interior contour of the receiving device 14 is constructed to be just as cylindrical as the outer contour of the pressed-in outer ring 11.7 of the bearing an its inner running surface.

Figure 13:
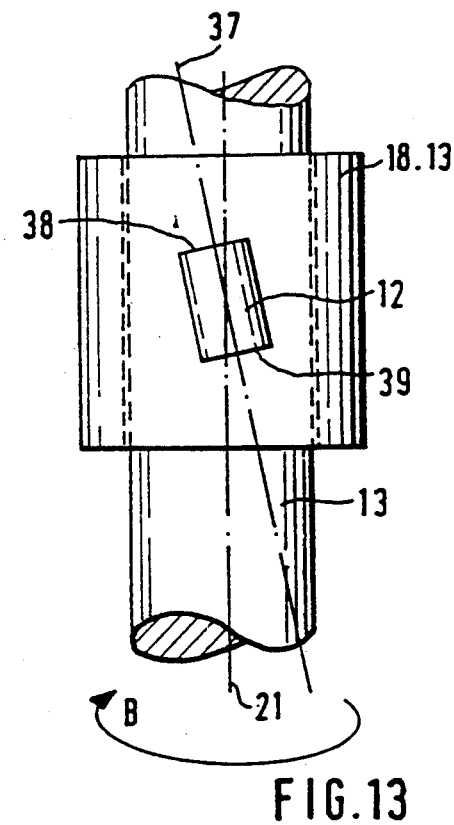
FIG. 13 is a schematic representation with a roller cage which forces a diagonal positioning of the rollers.

In the embodiment according to FIG. 13, which shows a roller cage 18.13 with only one roller 12, it is provided that the diagonal positioning of the axes of rotation 37 of the rollers 12 with respect to the spindle axis 21 is achieved by the fact that the roller pockets of the roller cage 18.13 provided with upper and lower supporting surfaces 38, 39 are arranged to be inclined correspondingly. However, it must be observed in the case of this embodiment that the rollers 12 then have a predetermined, not changing diagonal positioning of their rotating axes 37 with respect to the spindle axis 21 so that a spindle which is disposed in such a manner is suitable only for one rotating direction of the spindle; i.e., generates the desired additional axial thrust only in one rotating direction.

Figure 14:
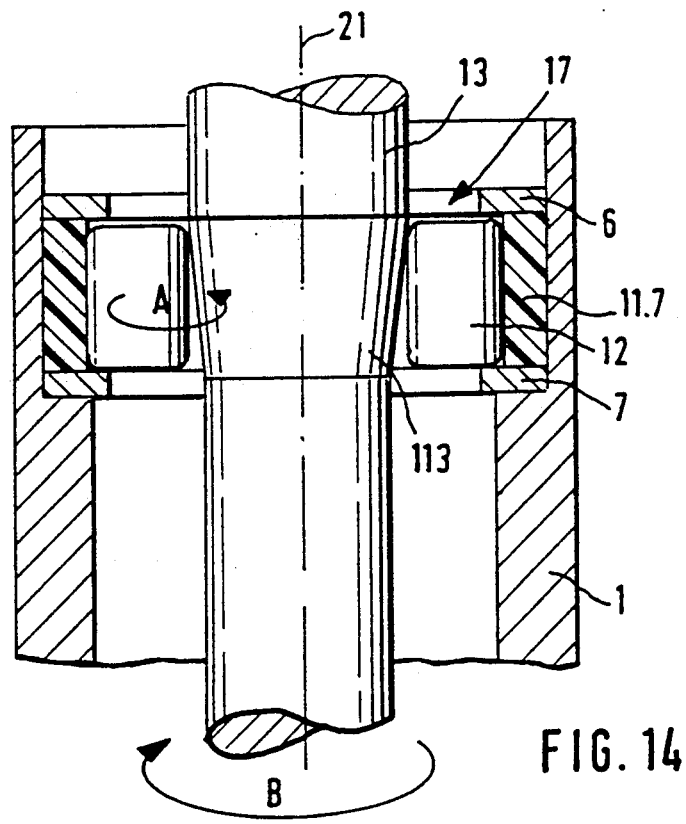
FIG. 14 is an axial sectional view of a spindle according to the invention in the area of the bolster having a spindle shaft which has a running surface tapering in the shape of a truncated cone in the direction of the step bearing.
Figure 15:
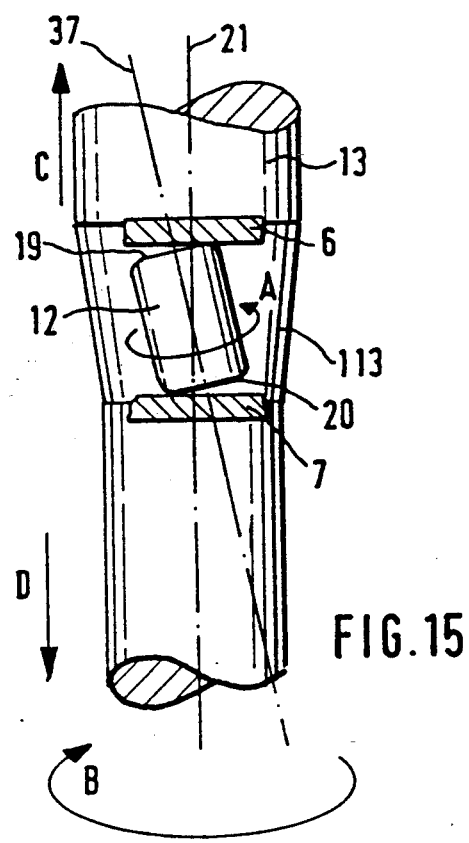
FIG. 15 is a view of the spindle shaft according to FIG. 14 where only one roller of the bolster is entered in the drawing.

FIGS. 14 and 15 show another embodiment of the invention by means of which an axial thrust can be generated in the direction of the arrow (D), i.e., in the direction of the step bearing 4, which affects the spindle shaft 13. Also in this embodiment, it is provided that the rollers 12 of the roller bearing 17 place themselves diagonally with respect to the axis 21 of the spindle shaft 13 in a defined manner, when the spindle shaft 13 is rotated, with their axes 37 of rotation. In order to achieve this diagonal positioning, it is provided in the embodiment according to FIG. 14 and 15 that the spindle shaft 13 has a running surface 113 which tapers in the shape of a truncated cone in the direction of the step bearing 4. By means of this truncated-cone-shaped running surface 113, the ability to demount the spindle top part is not impaired. On the exterior side, the rollers 12 are surrounded by an outer ring 11.7 of the bearing having a cylindrical running surface which is bounded in upward and downward direction by rim disks 6, 7. Also in this embodiment, the rollers 12 which, in FIG. 14, are shown in the neutral position, position themselves diagonally corresponding to the rotating direction (Arrow B) of the spindle shaft 13 in such a manner that an axial thrust is always obtained in the desired direction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A spinning or twisting spindle to be arranged vertically, comprising:
   a spindle bearing housing,
   a bolster constructed as a roller bearing disposed in the spindle bearing housing,
   a step bearing disposed in the spindle bearing housing at an axial location spaced from the roller bearing,
   a spindle shaft supported in the spindle bearing housing by the roller bearing and the step bearing,
   and roller bearing guide structure for guiding rollers of the roller bearing so that the guiding rollers are inclined with respect to a spindle shaft rotational axis so as to engage the spindle shaft surface to provide an axial thrust force on the spindle shaft toward the step bearing in response to rotation of the spindle shaft during operational use of the spindle, thereby preventing undesired movement of the spindle shaft in the direction from the step bearing toward the bolster.

2. A spinning or twisting spindle according to claim 1, wherein said roller bearing guide structure includes configuration of the rollers to have a shape which tapers in the shape of a truncated cone in the direction of the step bearing.

3. A spinning or twisting spindle according to claim 1, wherein said roller bearing guide structure includes configuration of the running surface of the spindle shaft to have a shape which tapers in the shape of a truncated cone in the direction of the step bearing.

4. A spinning or twisting spindle according to claim 1, wherein rollers of the roller bearing are held by means of a roller cage in the circumferential direction and by means of rims in the axial direction, said rollers running with their circumferential surfaces on a running surface of an outer ring of the bearing inserted into the spindle bearing housing and on a running surface of the spindle shaft.

5. A spinning or twisting spindle according to claim 4, wherein said roller bearing guide structure includes configuration of the running surface of the outer ring of the bearing to have a shape that widens in the shape of a truncated cone in the direction of the step bearing.

6. A spinning or twisting spindle according to claim 5, wherein the running surface of the outer ring of the bearing is produced in a truncated cone shape.

7. A spinning or twisting spindle according to claim 6, wherein the outer ring of the bearing is pressed into a receiving device of the spindle bearing housing, and wherein the receiving device has a lower deformation resistance in the radial direction in the area facing the step bearing than in the area facing away from the step bearing.

8. A spinning or twisting spindle according to claim 6, wherein the spindle bearing housing has a receiving device for the outer ring of the bearing, and wherein the receiving device and the outer ring of the bearing are jointly plastically deformed.

9. A spinning or twisting spindle according to claim 5, wherein the spindle bearing housing is provided with a receiving device for the outer ring of the bearing which is configured to exercise a deforming force on the outer ring of the bearing during assembly of same.

10. A spinning or twisting spindle according to claim 9, wherein the outer ring of the bearing is pressed into a receiving device of the spindle bearing housing, and wherein the receiving device has a lower deformation resistance in the radial direction in the area facing the step bearing than in the area facing away from the step bearing.

11. A spinning or twisting spindle according to claim 9, wherein the spindle bearing housing has a receiving device for the outer ring of the bearing, and wherein the receiving device and the outer ring of the bearing are jointly plastically deformed.

12. A spinning or twisting spindle according to claim 5, wherein the outer ring of the bearing is pressed into a receiving device of the spindle bearing housing, and wherein the receiving device has a lower deformation resistance in the radial direction in the area facing the step bearing than in the area facing away from the step bearing.

13. A spinning or twisting spindle according to claim 12, wherein the spindle bearing housing has a receiving device for the outer ring of the bearing, and wherein the receiving device and the outer ring of the bearing are jointly plastically deformed.

14. A spinning or twisting spindle according to claim 5, wherein the spindle bearing housing has a receiving device for the outer ring of the bearing, and wherein the receiving device and the outer ring of the bearing are jointly plastically deformed.

15. A spinning or twisting spindle according to claim 5, wherein the spindle bearing housing has a receiving device for the outer ring of the bearing, and wherein the receiving device and the outer ring of the bearing are jointly plastically deformed.

16. A spinning or twisting spindle according to claim 4, wherein said roller bearing guide structure includes roller pockets of the roller cage which are aligned diagonally with respect to the axis of the spindle shaft.

17. A spinning or twisting spindle according to claim 16, wherein the rollers have a shape which tapers in the shape of a truncated cone in the direction of the step bearing.

18. A spinning or twisting spindle according to claim 17, wherein the running surface of the spindle shaft has a shape which tapers in the shape of a truncated cone in the direction of the step bearing.

19. A spinning or twisting spindle according to claim 18, wherein the running surface of the outer ring of the bearing has a shape that widens in the shape of a truncated cone in the direction of the step bearing.

* * * * *